(12) United States Patent
Sim et al.

(10) Patent No.: US 8,856,037 B2
(45) Date of Patent: Oct. 7, 2014

(54) METHOD FOR SHOWCASING A BUILT-UP STRUCTURE AND AN APPARATUS ENABLING THE AFOREMENTIONED METHOD

(75) Inventors: Wong Hoo Sim, Singapore (SG); Willie Png, Singapore (SG)

(73) Assignee: Creative Technology Ltd, Singapore (SG)

( * ) Notice: Subject to any disclaimer, the term of this patent is extended or adjusted under 35 U.S.C. 154(b) by 42 days.

(21) Appl. No.: 13/513,368

(22) PCT Filed: Nov. 26, 2010

(86) PCT No.: PCT/SG2010/000444
§ 371 (c)(1),
(2), (4) Date: Jun. 1, 2012

(87) PCT Pub. No.: WO2011/068476
PCT Pub. Date: Jun. 9, 2011

(65) Prior Publication Data
US 2012/0239532 A1  Sep. 20, 2012

(30) Foreign Application Priority Data

Dec. 1, 2009  (SG) ................................ 200907970-8

(51) Int. Cl.
*G06Q 30/00* (2012.01)
*G06Q 50/16* (2012.01)
*G06Q 30/02* (2012.01)
*G06Q 30/06* (2012.01)

(52) U.S. Cl.
CPC ................ *G06Q 50/16* (2013.01); *G06Q 30/02* (2013.01); *G06Q 30/0643* (2013.01)
USPC ....................................................... 705/26.1

(58) Field of Classification Search
USPC ....................................................... 705/26.1
See application file for complete search history.

(56) References Cited

U.S. PATENT DOCUMENTS

| | | | |
|---|---|---|---|
| 6,885,817 B2 | 4/2005 | Artonne et al. | |
| 2002/0052755 A1 | 5/2002 | Whatley et al. | |
| 2006/0036513 A1* | 2/2006 | Whatley et al. | 705/27 |
| 2007/0025723 A1 | 2/2007 | Baudisch et al. | |

FOREIGN PATENT DOCUMENTS

WO   9959026 A2   11/1999

\* cited by examiner

*Primary Examiner* — Mila Airapetian
(74) *Attorney, Agent, or Firm* — Russell Swerdon; Desmund Gean

(57) ABSTRACT

There is provided a method for showcasing a built-up structure with at least one room. It is advantageous that the user is able to view the interior of the built-up structure by accessing and navigating about a single panoramic image for each room. An apparatus enabling the method and a method of using a work product of the method for showcasing a built-up structure with at least one room is also provided.

16 Claims, 3 Drawing Sheets

METHOD FOR SHOWCASING A BUILT-UP STRUCTURE AND AN APPARATUS ENABLING THE AFOREMENTIONED METHOD

FIELD OF INVENTION

This invention relates to a method of how a built-up structure may be showcased to third parties at a different location to the built-up structure, and to an apparatus enabling the aforementioned method.

BACKGROUND

Purchasing a property typically involves not only a substantial financial outlay, but invariably also involves a substantial time commitment from a buyer to find a desirable property. A lot of time is typically spent identifying, travelling to, and viewing prospective properties. This is so even during instances when photographs and videos of prospective properties are made available on online "property for sale" portals which are accessible from anywhere in the world via the world wide web.

This is because while the photographs and videos are able to provide the buyer with a cursory overview of various aspects of a prospective property, the buyer is usually mindful that the photographs and videos are made available after a selection process to showcase primarily the highlights/merits and none of the shortcomings of the property. This lack of information available to the buyer usually would lead to the buyer making at least one trip to the property to confirm that any shortcomings would not overshadow the highlights/merits of the property. Unfortunately, the making of the at least one trip to view the property takes up both time and financial resources.

In addition, the photographs and videos of the property provided for the buyer typically do not allow any form of interactivity. The photographs and videos are merely for viewing, and they do not allow the buyer to view any portion of the property where the buyer so desires. The photographs and videos also do not aid the buyer in visualizing how specific pieces of furniture/structures/appliances will appear either within confines or at certain areas of the property.

In this regard, there are some issues relating to how properties and built-up structures in general are shown in a favourable manner to prospective buyers which the present invention aims to address for the benefit of the buyers.

SUMMARY

There is provided a method for showcasing a built-up structure with at least one room. The method includes obtaining a single panoramic image for each room, the single panoramic image showing an all-around perspective of each room; locating doorways in the single panoramic image for each room; creating a first hyperlink at each of the doorways, with selection of the first hyperlink enabling a user to view the single panoramic image for an adjoining room sharing the doorway where the first hyperlink is created; locating windows in the single panoramic image for each room; and creating a second hyperlink at each of the windows, with selection of the second hyperlink enabling the user to view a representative image showing a scene obtained from the window where the second hyperlink is created. It is advantageous that the user is able to view the interior of the built-up structure by accessing and navigating about the single panoramic image for each room.

The single panoramic image may be obtained from stitching a plurality of images from either a single image capture apparatus or a plurality of image capture apparatus. The plurality of image capture apparatus may be arranged in a manner where edges of a field of view for each of the plurality of image capturing devices overlap.

The selection of the first and the second hyperlinks may generate a visual effect to represent movement of the user towards the doorways and the windows respectively.

The single panoramic image for each room may also be associated with an audio file which is played back when the single panoramic image is viewed by the user. The audio file may include content selected from, for example, music, speech, a combination of music and speech and so forth.

The representative image may also be associated with an audio file which is played back when the representative image is viewed by the user. The audio file may include content selected from, for example, music, speech, a combination of music and speech and the like. The representative image may depict the scene outside the room where the window is located.

The method may further include creating location information of the built-up structure for each single panoramic image for each room. The location information may be viewable by the user either because the location information is printed in the single panoramic image or because the user chooses to retrieve data parameters of the single panoramic image.

In addition, the method may also include creating date-time image generation information for each single panoramic image for each room, with the date-time image generation information being viewable by the user either because the date-time image generation information is printed in the single panoramic image or because the user chooses to retrieve data parameters of the single panoramic image.

Similarly, the method may also include creating date-time image generation information for each representative image for each window, with the date-time image generation information being viewable by the user either because the date-time image generation information is printed in the representative image or because the user chooses to retrieve data parameters of the representative image.

The method may also include recording a user navigation path for the single panoramic image for each room in a sequential manner. Preferably, playback of the recording of the user navigation path is restricted.

The method may also including overlaying objects onto either the single panoramic image or the representative image, with the objects being of a perspective-corrected form.

There is also provided an apparatus for obtaining a single panoramic image, the single panoramic image showing an all-around perspective of a location. The apparatus includes a plurality of image capturing devices arranged in a manner where edges of a field of view for each of the plurality of image capturing devices overlap; a memory module coupled to the plurality of image capturing devices to store images from the plurality of image capturing devices; a controller coupled to the memory module to process images from the plurality of image capturing devices, and to stitch the images stored in the memory module; a display coupled to the controller to preview the single panoramic image after the images from the plurality of image capturing devices are stitched together; and an actuator coupled to the controller for the user to trigger a capture of the previewed single panoramic image. The apparatus may be mounted either on a vehicle or on the user.

In a final aspect, there is provided a method of using a work product of a method for showcasing a built-up structure with at least one room for viewing of an interior of at least one built-up structure. The method includes accessing an online portal to view an interior of the at least one built-up structure; selecting at least one built-up structure for online viewing; choosing one of three options to both view the interior of the at least one built-up structure and communicate with a party brokering a transaction for the built-up structure, with a first option including navigating about the work product independently, contacting the party for communications, and the party navigating about the work product, a second option including navigating about the work product in a pre-defined manner, contacting the party for communications, and the party navigating about the work product, and a third option including contacting the party for communications, and the party navigating about the work product.

The navigation of the work product by the party may be done remotely to show/clarify a particular aspect of the built-up structure. The communications may be either a voice communications session, or a video communications session. The online portal may facilitate purchase of property, either on a buyer-seller basis or on an auction basis, where the online portal allows either unrestricted content access for all parties or subscriber/member only restricted content access.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

It should be appreciated that the present invention which will be described in subsequent portions of the description is merely illustrative, and an order of either steps or features which is described may be varied without departing from a scope of the present invention.

Figure 1:
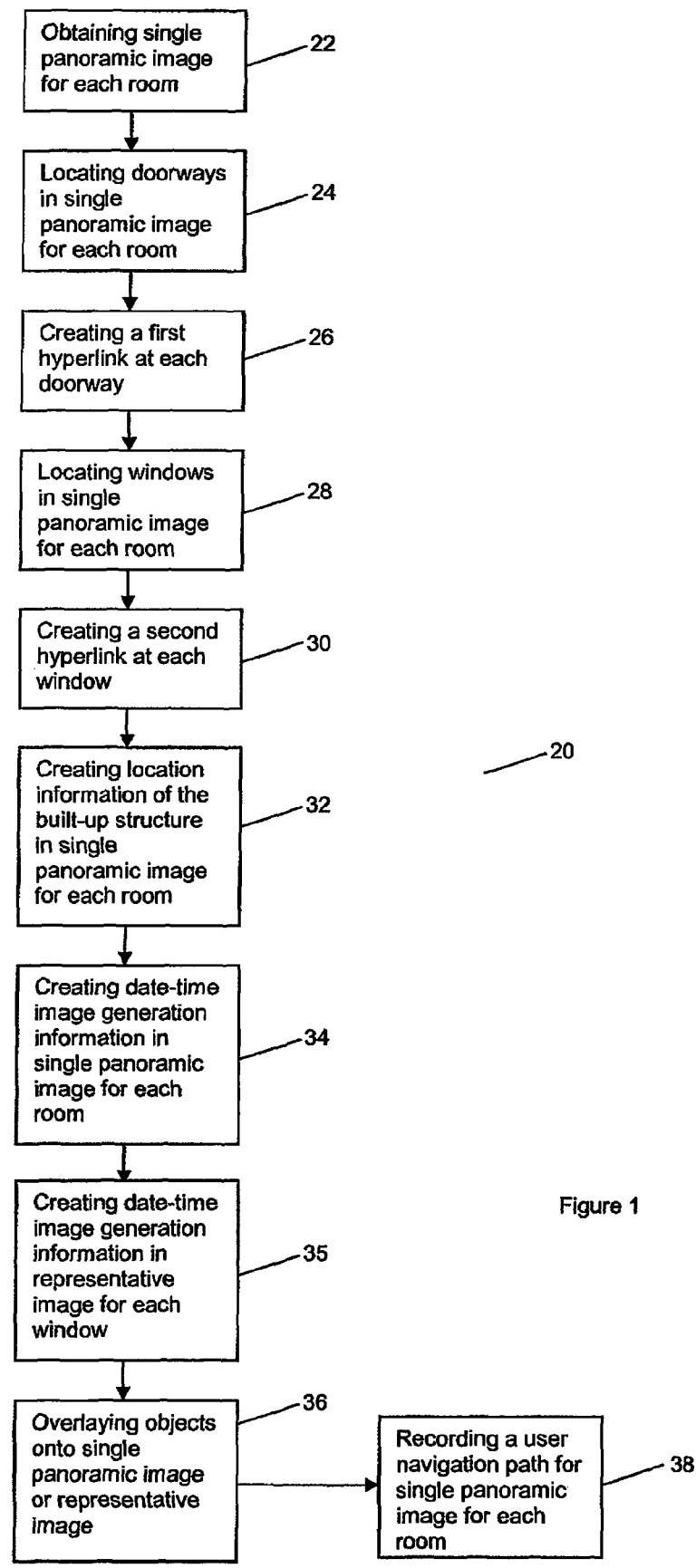
FIG. 1 shows a process flow of the method of the present invention.

Referring to FIG. 1, there is shown a process flow for a method 20 for showcasing a built-up structure with at least one room. It is advantageous that the method 20 allows every room of the built-up structure to be fully showcased to a third party. The method 20 need not adhere to the sequence as described in the subsequent paragraphs. However, the method 20 primarily includes the various steps which will be described in the subsequent paragraphs.

Figure 2:
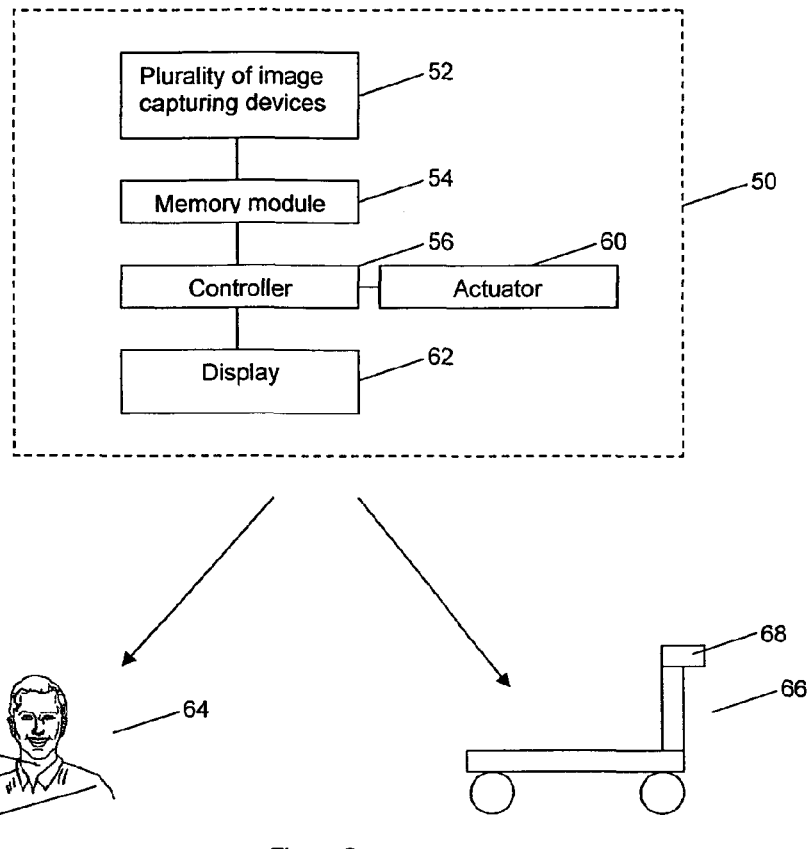
FIG. 2 shows a schematic diagram of an apparatus enabling the method of FIG. 1.

The method 20 includes obtaining a single panoramic image for each room (22), with the single panoramic image showing an all-around perspective of each room. The single panoramic image should be captured from a substantially central position in each room. FIG. 2 shows a schematic diagram of an apparatus 50 which may be used to obtain the single panoramic image for each room. Both features and usage of the apparatus 50 will be described in greater detail in a subsequent portion of the description. The single panoramic image for each room may be obtained from stitching a plurality of images from either a single image capture device or a plurality of image capture devices (may be in a form of the apparatus 50). When the single image capture device is utilized, each image captured by the single image capture device should have overlapping portions with both a prior image and a subsequent image such that stitching of the plurality of images may be possible. When the plurality of image capture devices is utilized, the plurality of image capturing devices may be arranged in a manner where edges of a field of view for each of the plurality of image capturing devices overlap, such that images captured by each of the plurality of image capturing devices may be stitched together. When the plurality of image capture devices is utilized, each of the plurality of image capture devices may capture images simultaneously as this leads to convenience and time savings for a user.

The single panoramic image for each room may be associated with an audio file which is played back when the single panoramic image is viewed by the user. The audio file may include content such as, for example, music, speech, a combination of music and speech, and so forth. The audio file may enhance a mood of the user viewing the single panoramic image, and speech in the audio file may aid the user in appreciating the room shown in the single panoramic image.

The method 20 also includes locating doorways in the single panoramic image for each room (24). Once the doorways are located, a first hyperlink is created at each of the doorways (26). Selection of the first hyperlink at each doorway enables a user to view the single panoramic image for an adjoining room sharing the doorway where the first hyperlink is created. The selection of the first hyperlink may generate a visual effect to represent movement of the user towards the doorway. The visual effect may include, for example, a zooming-in on an appearance of the doorway, an opening of a door at the doorway, and so forth.

Subsequently, the method 20 includes locating windows in the single panoramic image for each room (28). Once the windows are located, a second hyperlink is created at each of the windows (30). Selection of the second hyperlink at each window enables the user to view a representative image showing a scene obtained from the window where the second hyperlink is created. The selection of the second hyperlink may also generate a visual effect to represent movement of the user towards the window. The visual effect may include, for example, a zooming-in on an appearance of the window, an opening of the window, a de-tinting of the window, and so forth.

The representative image showing a scene obtained from the window may also be a panoramic image. However, the representative image need not be an all-around perspective from the window. The representative image should primarily depict the scene outside the room where the window is located. The representative image may be associated with an audio file which is played back when the representative image is viewed by the user. The audio file may include content such as, for example, music, speech, a combination of music and speech, and so forth. The audio file may enhance a mood of the user viewing the representative image, and speech in the audio file may aid the user in appreciating the scene shown in the representative image.

In the method 20, there may be an inclusion of creating location information of the built-up structure in each single panoramic image for each room (32). The location information may be in a form of either an address, or GPS coordinates. The location information provides the user with a degree of assurance that the single panoramic image for each room is from a property at a particular location and not obtained from a different piece of property. The location information may be viewable by the user when viewing the single panoramic image either because the location information is printed in the single panoramic image or because the user chooses to retrieve data parameters (like metadata) of the single panoramic image. The printing of the location information may be either in a form of a digital watermark or clearly legible to anyone viewing the single panoramic image.

The method 20 may further include creating date-time image generation information for each single panoramic image for each room (34). The date-time image generation information provides the user with some degree of assurance that the single panoramic image for each room is current, shows a current state of each room and also shows natural light conditions in each room at a particular time. The date-time image generation information may be viewable by the user when viewing the single panoramic image either because the date-time image generation information is printed in the single panoramic image or because the user chooses to retrieve data parameters (like metadata) of the single panoramic image. The printing of the date-time image generation information may be either in a form of a digital watermark or clearly legible to anyone viewing the single panoramic image.

The method 20 may also similarly further include creating date-time image generation information for each representative image for each window (35). The date-time image generation information provides the user with a degree of assurance that the representative image for each window is current and shows a current view from each window. The date-time image generation information may be viewable by the user when viewing the representative image either because the date-time image generation information is printed in the representative image or because the user chooses to retrieve data parameters (like metadata) of the representative image. The printing of the date-time image generation information may be either in a form of a digital watermark or clearly legible to anyone viewing the single panoramic image.

The method 20 may also include overlaying of objects onto either the single panoramic image or the representative image (36). The objects may be of a perspective-corrected form, with the objects being, for example, furniture, structures, appliances, and so forth. Overlaying the objects may both aid the user in visualizing how the objects may appear when placed on the premises of the property and provide a representation of space utilization in relation to how/where the objects are placed. The objects may be made available to the user from a central repository which stores an extensive selection of the objects. The objects may be created by third parties at a request of the user prior to storage at the central repository. This is due to the large numbers of objects which may be used.

Finally, the method 20 may further include recording a user navigation path for the single panoramic image for each room in a sequential manner (38). The user navigation path may be in a form which highlights merits in each room. The user navigation path may appear like a walk-through for each room. Voice may also be recorded such that the user navigation path also includes a talk-through for each room. The recorded user navigation path may be defined as a preferred way to view each room when accessing the various single panoramic images. The recorded user navigation path may be stored as a media file for subsequent playback. It should be noted that playback of the recording of the user navigation path may be restricted to prevent unauthorized distribution of the recording of the user navigation path. The recorded navigation path may be accessible only through an online portal, with the online portal being configured to prevent the recorded navigation path from being replicated and stored by visitors to the online portal. The recorded navigation path may include digital rights management encoding such that controlled distribution of the recorded navigation path may be possible.

In this regard, it is advantageous that the user is able to view the entire interior of a built-up structure to which the method 20 has been applied by accessing and navigating about the single panoramic image for each room in the built-up structure.

Referring to FIG. 2, there is provided an apparatus 50 for obtaining a single panoramic image as mentioned in the aforementioned method 20. The single panoramic image may show an all-around perspective of a location. The apparatus 50 may include a plurality of image capturing devices (52) arranged in a manner where edges of a field of view for each of the plurality of image capturing devices (52) overlap such that images captured by each of the plurality of image capturing devices (52) may be stitched together. Each of the plurality of image capture devices may capture images simultaneously as this leads to convenience and time savings for a user.

The apparatus 50 may also include a memory module (54) coupled to the plurality of image capturing devices (52) to store images from the plurality of image capturing devices (52). A controller (56) may be coupled to the memory module (54) to process images from the plurality of image capturing devices (52), and to stitch the images stored in the memory module (54). The controller (56) may be used for controlling all functions of the apparatus 50.

There may also be a display (62) coupled to the controller (56) to preview the single panoramic image after the various images from each of the plurality of image capturing devices (52) are stitched together. The display (62) may be important for the user to determine whether the single panoramic image has captured either too much or too little of the ceiling/floor of the room. Similarly, the display (62) may be useful for the user to determine whether the single panoramic image is formed from images captured on a level plane.

The apparatus 50 may also include an actuator (60) coupled to the controller (56) for the user to trigger a capture the previewed single panoramic image. The actuator (60) may be activated by a remote control which may be either wireless or wired. The remote control may enhance user convenience in relation to activating the actuator (60). The apparatus 50 may be mounted either on a vehicle 66 or on the user 64.

Mounting the apparatus 50 on the user 64 would require the apparatus 50 to be mounted in a manner such that images from each of the plurality of image capturing devices are captured on a level plane. The apparatus 50 may be worn on the user 64 in a form of headgear such as either a hat or a cap. The headgear may also include reliance on support from shoulders 70 of the user 64 as a weight of the apparatus 50 may not be supportable primarily by a neck 72 of the user 64.

The vehicle 66 should have a stand 68 for mounting the apparatus 50. The stand 68 should be height-adjustable to allow the apparatus 50 to be mounted at different heights. The height-adjustable stand 68 is also necessary as rooms typically have different ceiling heights. The adjustable stand 68 of the vehicle 66 may allow the capture of a single panoramic image showing an appropriate amount of the ceiling regardless of ceiling height of each room. The vehicle 66 may be either motorized or manually moved around by the user 64.

Figure 3:
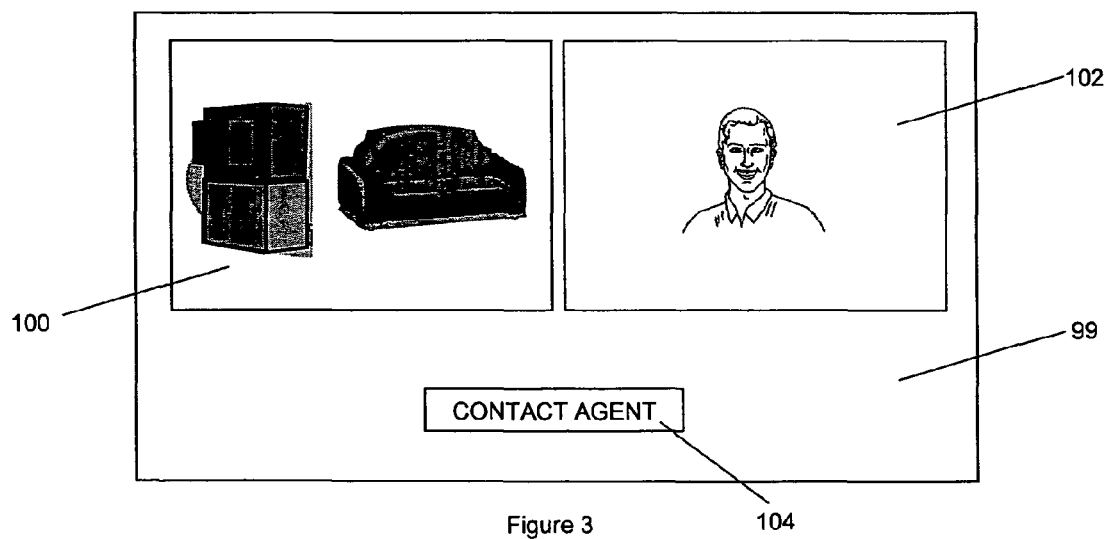
FIG. 3 shows an illustrative representation of an application of a resultant product of the method of FIG. 1.
Figure 4:
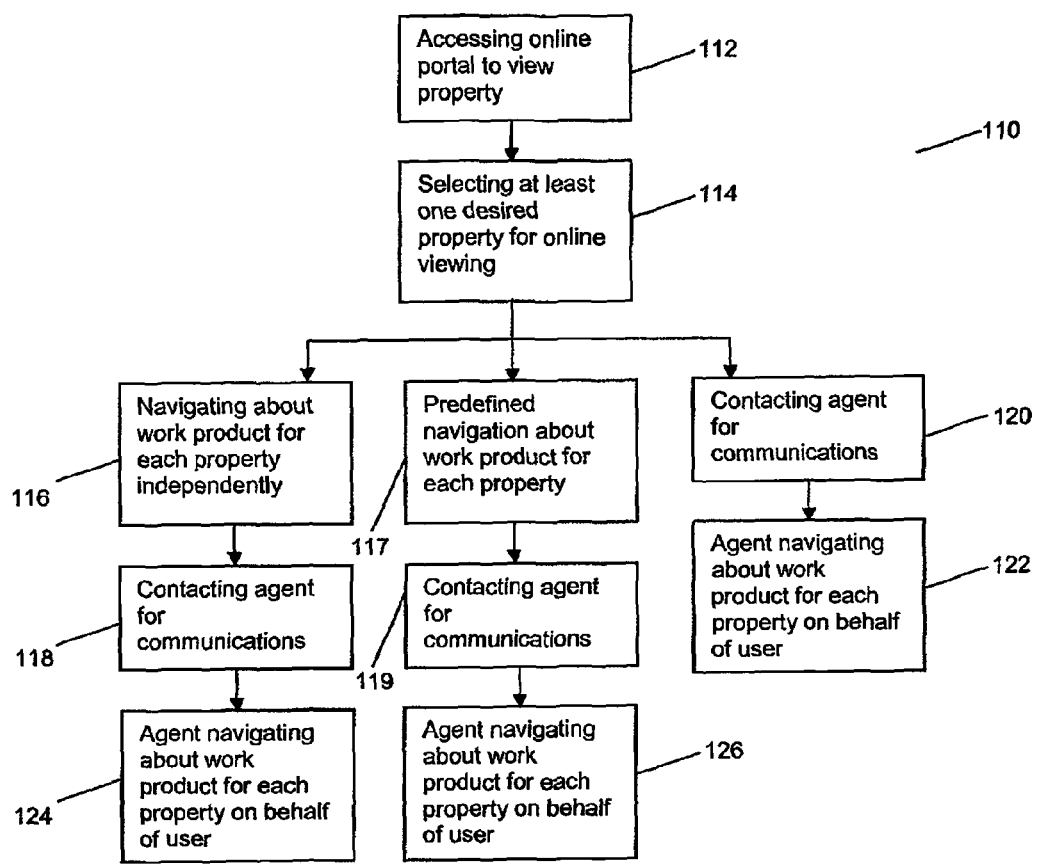
FIG. 4 shows a process flow for the possible application of FIG. 3.

Referring to FIG. 4, there is shown a process flow for a method 110 for utilizing a work product of the earlier mentioned method 20 to showcase a built-up structure. Correspondingly, FIG. 3 shows an illustrative representation of an application of the work product of the earlier mentioned method 20. FIG. 4 shows how the work product is utilized while FIG. 3 illustrates how the work product is utilized.

In the method 110, the user may access an online portal to view at least one property (112). The online portal may be a portal which facilitates purchase of property, either on a buyer-seller basis or on an auction basis. The online portal may allow either unrestricted content access for all parties or subscriber/member only restricted content access. As the online portal should enable viewing access to a plurality of properties, once the user is able to access contents of the online portal, the user may select at least one desired property for online viewing (114).

Once the user selects the at least one desired property for online viewing (114), an interface 99 as illustrated for example in FIG. 3 may be presented to the user. In the interface 99, the user may navigate about the work product for each property independently (116) while viewing the property online on a viewer 100 in the interface 99. It should be appreciated that the viewer 100 may be a software application which is able to present the work product to the user. The advantages of using the work product to view the property have already been mentioned in the preceding sections. Once the user has completed viewing each property, or even while the user is in the midst of viewing each property, the user may initiate a communications session (118) with a party brokering a transaction for the property (agent). The user may virtually actuate an activator 104 on the interface 99 to initiate the communications session. The communications session may be either a voice communications session, or a video communications session. The voice communications session may be enabled by VoIP. During the voice communications session with the agent, a communications screen 102 may be either blank or showing a visual representation of the agent. The visual representation may include, for example, a pre-recorded video image of the agent, a still image of the agent, an animated representation of the agent and the like. During the video communications session, an image of the agent may appear in the communications screen 102 on the interface 99. At any time during the communications session, the agent may be able to remotely control the viewer 100 on the interface 99 and remotely navigate about the work product (124) to show/clarify a particular aspect of the property to the user.

Alternatively, the user may view a predefined navigation of the work product for each property (117) through the viewer 100 on the interface 99. The predefined navigation of the work product is similar to the recorded user navigation path mentioned in the earlier portion of the description for the method 20. Once the user has completed viewing each property, or even while the user is in the midst of viewing each property, the user may initiate a communications session with the agent (119). The user may virtually actuate the activator 104 on the interface 99 to initiate the communications session. The communications session may be either a voice communications session, or a video communications session. The voice communications session may be enabled by VoIP. During the voice communications session with the agent, a communications screen 102 may be either blank or showing a visual representation of the agent. The visual representation may include, for example, a pre-recorded video image of the agent, a still image of the agent, an animated representation of the agent and the like. During the video communications session, an image of the agent may appear in the communications screen 102 on the interface 99. At any time during the communications session, the agent may be able to remotely control the viewer 100 on the interface 99 and remotely navigate about the work product (126) to show/clarify a particular aspect of the property to the user.

In the method 110, the user has another option of being guided an entire way of the property viewing process by the agent. The user initiates a communications session with the agent (120). The user may virtually actuate the activator 104 on the interface 99 to initiate the communications session. The communications session may be either a voice communications session, or a video communications session. The Voice communications session may be enabled by VoIP. During the voice communications session with the agent, a communications screen 102 may be either blank or showing a visual representation of the agent. The visual representation may include, for example, a pre-recorded video image of the agent, a still image of the agent, an animated representation of the agent and the like. During the video communications session, an image of the agent may appear in the communications screen 102 on the interface 99. At any time during the communications session, the agent may be able to remotely control the viewer 100 on the interface 99 and remotely navigate about the work product (122) to show/clarify a particular aspect of the property to the user. The agent may also let the user view a predefined navigation of the work product for each property through the viewer 100 on the interface 99.

Whilst there has been described in the foregoing description preferred embodiments of the present invention, it will be understood by those skilled in the technology concerned that many variations or modifications in details of design or construction may be made without departing from the present invention.

The invention claimed is:

1. A method for showcasing a built-up structure with at least one room, the method including:
    obtaining a single panoramic image for each room, the single panoramic image showing an all-around perspective of each room;
    locating doorways in the single panoramic image for each room;
    creating a first hyperlink at each of the doorways, with selection of the first hyperlink enabling a user to view the single panoramic image for an adjoining room sharing the doorway where the first hyperlink is created;
    locating windows in the single panoramic image for each room; and
    creating a second hyperlink at each of the windows, with selection of the second hyperlink enabling the user to view a representative image showing a scene obtained from the window where the second hyperlink is created;
    wherein the user is able to view the interior of the built-up structure by accessing and navigating about the single panoramic image for each room.

2. The method of claim 1, wherein the single panoramic image is obtained from stitching a plurality of images from either a single image capture apparatus or a plurality of image capture apparatus.

3. The method of claim 2, wherein the plurality of image capture apparatus are arranged in a manner where edges of a field of view for each of the plurality of image capturing devices overlap.

4. The method of claim 1, wherein the selection of the first and the second hyperlinks generates a visual effect to represent movement of the user towards the doorways and the windows respectively.

5. The method of claim 1, wherein the single panoramic image for each room is associated with an audio file which is played back when the single panoramic image is viewed by the user, wherein the audio file includes content selected from the group consisting of: music, speech, and a combination of music and speech.

6. The method of claim 1, wherein the representative image is associated with an audio file which is played back when the representative image is viewed by the user, wherein the audio file includes content selected from the group consisting of: music, speech, and a combination of music and speech.

7. The method of claim 1, further including creating location information of the built-up structure for each single panoramic image for each room.

8. The method of claim 7, wherein the location information is viewable by the user either because the location information is printed in the single panoramic image or because the user chooses to retrieve data parameters of the single panoramic image.

9. The method of claim 1, further including creating date-time image generation information for each single panoramic image for each room, wherein the date-time image generation information is viewable by the user either because the date-time image generation information is printed in the single panoramic image or because the user chooses to retrieve data parameters of the single panoramic image.

10. The method of claim 1, further including creating date-time image generation information for each representative image for each window, wherein the date-time image generation information is viewable by the user either because the date-time image generation information is printed in the representative image or because the user chooses to retrieve data parameters of the representative image.

11. The method of claim 1, further including recording a user navigation path for the single panoramic image for each room in a sequential manner.

12. The method of claim 11, wherein playback of the recording of the user navigation path is restricted.

13. The method of claim 1, further including overlaying objects onto either the single panoramic image or the representative image, with the objects being of a perspective-corrected form.

14. The method of claim 1, wherein the representative image depicts the scene outside the room where the window is located.

15. An apparatus for obtaining a single panoramic image for each room of a built-up structure the apparatus including:
a plurality of image capturing devices arranged in a manner where edges of a field of view for each of the plurality of image capturing devices overlap;
a memory module coupled to the plurality of image capturing devices to store images from the plurality of image capturing devices;
a controller coupled to the memory module to process images from the plurality of image capturing devices, and to stitch the images stored in the memory module, the controller further configured to:
obtain a single panoramic image for each room of the built-up structure, the single panoramic image showing an all-around perspective of each room;
locate doorways in the single panoramic image for each room;
create a first hyperlink at each of the doorways, with selection of the first hyperlink enabling a user to view the single panoramic image for an adjoining room sharing the doorway where the first hyperlink is created;
locate windows in the single panoramic image for each room; and
create a second hyperlink at each of the windows, with selection of the second hyperlink enabling the user to view a representative image showing a scene obtained from the window where the second hyperlink is created;
wherein the user is able to view the interior of the built-up structure by accessing and navigating about the single panoramic image for each room;
a display coupled to the controller to preview the single panoramic image after the images from the plurality of image capturing devices are stitched together; and
an actuator coupled to the controller for the user to trigger a capture of the previewed single panoramic image,
wherein the apparatus is mounted either on a vehicle or on the user.

16. An apparatus for obtaining a single panoramic image, the single panoramic image showing an all-around perspective of a location, the apparatus including:
a plurality of image capturing devices arranged in a manner where edges of a field of view for each of the plurality of image capturing devices overlap;
a memory module coupled to the plurality of image capturing devices to store images from the plurality of image capturing devices;
a controller coupled to the memory module to process images from the plurality of image capturing devices, and to stitch the images stored in the memory module;
a display coupled to the controller to preview the single panoramic image after the images from the plurality of image capturing devices are stitched together; and
an actuator coupled to the controller for the user to trigger a capture of the previewed single panoramic image,
wherein the apparatus is mounted either on a vehicle or on the user, and
wherein the controller is further configured to:
obtain a single panoramic image for each room of a built-up structure, the single panoramic image showing an all-around perspective of each room;
locate doorways in the single panoramic image for each room;
create a first hyperlink at each of the doorways, with selection of the first hyperlink enabling a user to view the single panoramic image for an adjoining room sharing the doorway where the first hyperlink is created;
locate windows in the single panoramic image for each room; and
create a second hyperlink at each of the windows, with selection of the second hyperlink enabling the user to view a representative image showing a scene obtained from the window where the second hyperlink is created;
wherein the user is able to view the interior of the built-up structure by accessing and navigating about the single panoramic image for each room.

* * * * *